INVENTORS
HEINZ ZIEGLER
FRITZ SCHLEICH
BY Roger A. Van Kirk
ATTORNEY

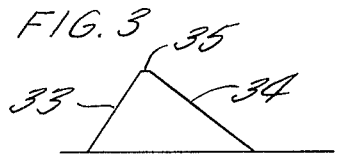
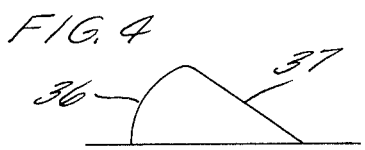
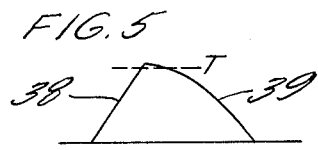
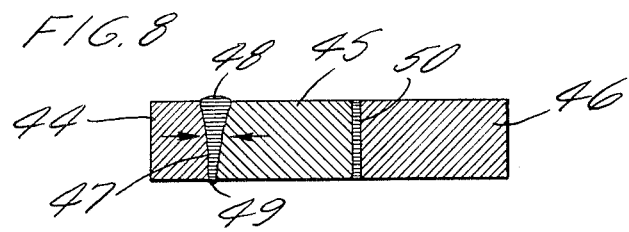

United States Patent Office 3,258,576
Patented June 28, 1966

3,258,576
PROCESS FOR WELDING AND SOLDERING BY MEANS OF A BEAM OF CHARGED PARTICLES
Fritz Schleich, Unterkochen, Wurttemberg, and Heinz Ziegler, Aalen, Wurttemberg, Germany, assignors to United Aircraft Corporation, East Hartford, Conn.
Filed Nov. 30, 1964, Ser. No. 414,669
Claims priority, application Germany, Nov. 28, 1963, Z 10,502
4 Claims. (Cl. 219—117)

It is known to weld or solder workpieces of various materials by means of a beam of charged particles. In this process the beam of charged particles is focused on the workpieces to be connected and these workpieces are moved relative to the beam in the welding direction.

If an electron beam is employed whose intensity is only sufficient for the direct melting of a surface layer, a welding seam is produced whose cross-section does not differ substantially from the cross-section of welding seams which are obtained with ordinary processes, for example by an arc welding process. Consequently such an electron beam welding presents also all the disadvantages of the known welding processes. Its only advantage resides in the fact that it is possible to connect materials which are very sensitive to impurities because the welding or the soldering is carried out in vacuum.

A decided advantage was obtained with the welding process known as "deep-welding." In this process a beam of charged particles is focused on the workpieces to be connected and its intensity or power density adjusted such that the beam penetrates very deeply into the workpieces and melts the material over its entire penetration depth practically simultaneously. In this process very deep penetration depths can be obtained, for example it is possible to make without difficulty butt welds of steel plates having a thickness of 40 mm. The weld seams produced are characterized in that their ratio of depth to width is very high. Welds may be obtained whose ratio of depth to width is 20:1 and even higher. Therefore the weld seam produced is very narrow. It presents normally a cross-section which is approximately V-shaped.

For a full disclosure of the "deep-welding" process, reference may be had to U.S. Patent No. 2,987,610, issued to K. H. Steigerwald on June 6, 1961.

It is believed that during "deep-welding" the beam of charged particles penetrates into the workpiece while forming an unusually narrow channel filled with vapor of the material, and thereby heats and melts the workpiece adjacent to the walls of this channel. As the beam of charged particles is moved on, the fluid material flows together and forms a perfect weld. The liquid material cools very quickly and returns to its solid state.

In view of the very quick cooling of the material there exists the danger that cavities may be formed. In spite of the small amount of material which is melted, there is also the effect that the two workpieces to be connected are slightly drawn together during the cooling of the material so that some fluid mass flows out at the top and bottom side of the workpieces. This produces the upper and lower beads of the welding seam. However, the drawing together of the workpiece related to the formation of these beads may not be desirable. It is conceivable that in this shrinkage process, due to the rapid cooling of the molten material, an undesirable grain structure may result.

Tests have shown that an even more narrow welding seam can be obtained when the beam of charged particles is applied intermittently. During the impulse duration the beam reaches in this case the necessary power density for a deep penetration. As the material is melted in this process only for a short time, a very narrow welding seam is obtained. But this welding seam has the disadvantage that it presents no upper and lower bead, but that instead a groove is produced on both sides of the material. The groove at the upper side of the material is produced due to evaporation of material. The groove on the lower side of the material is caused basically due to the effect of surface tension. In pulsed beam welding, a comparatively small amount of material is melted and accordingly shrinkage or drawing together of the workpieces no longer takes place. But porosity and cavity formation within the welding seam as well as occassionally an unfavorable influence on the grain structure is encountered also in this case.

The present invention now relates to a process for welding and soldering by means of a beam of charged particles which is applied in a succession of impulses. This process avoids all the disadvantages of the known electron beam welding processes and provides additionally a number of substantial advantages.

According to this invention the impulses of the beam of charged particles are of such a form that each impulse reaches a power density which is sufficient to evaporate the material ("deep weld") only during a time which is short in comparison to the impulse duration and has a decay time which is long in comparison to the time during which "deep welding" occurs. During this decay time, the material is subjected to a controlled cooling. Accordingly, there is obtained during each impulse, for a very short time, a power density which is sufficient to evaporate the material. During this time the beam of charged particles penetrates deeply into the material, i.e. a "deep-weld" is obtained. As the time available here is very short, only a very small amount of material is melted along the penetration zone of the beam of charged particles, and a very narrow welding zone is produced. During the decaying portion of each impulse the power supplied decreases slowly and the material is cooled slowly. Due to this controlled slow cooling of the material, welding seams are produced which are practically free of cavities.

In welding thinner workpieces and in all cases where it is important to avoid a groove along the welding seam the impulses are preferably of such a form that each impulse has also a rise time which is long in comparison to the time during which "deep welding" occurs. During this rise time a gradual heating of the material takes place, especially at the surface. The "deep-welding" takes place only when the impulse reaches an amplitude in excess of that required to produce a beam whose power density is in excess of the threshold value required for penetration of the beam into the particular material being worked. Tests have shown that a disturbing evaporation of material at the surface of the workpieces to be connected may be avoided to a large extent by the aforementioned long rise time of the impulses. This also prevents formation of a groove, i.e. a welding seam is obtained which normally closes at the surface of the workpiece.

The use of impulses having a long rising edge and a long decaying edge is recommended particularly for spot welding. In using impulses of such form, spot welds are obtained which show practically no depressions at the upper and lower sides of the welding spot.

The impulses of the beam of charged particles are appropriately of such a form that the power density which is sufficient for the evaporation of the material is reached in each instance only during a time interval which is preferably 0.01 to 0.1 part of the impulse duration and that the decay time is in each instance at least as long or longer than the rise time. In a preferred embodiment of this invention, the total duration of each impulse is appropriately below $10^{-2}$ sec.

In one test, wherein steel plates having a thickness of 3 mm. were to be joined by a butt weld, impulses were used in which the rise time was 100 µsec., the decay time 200 µsec. and the time during which the full power density was reached, about 10 µsec. The pulse duty factor, i.e. the ratio of impulse duration to impulse spacing was 1:10. With an accelerating voltage of 100 kv. the maximum beam current, reached in the mentioned 10 µsec. period, was about 7 ma. This produced a welding seam having parallel walls, practically free of cavities, and about 0.3 mm. wide.

In the new process the beam of charged particles is applied in a succession of impulses. The pulse duty factor, i.e. the ratio of impulse duration to impulse spacing is in this case dependent on the thickness of the material and on the material itself. In general this ratio of values will lie approximately between 1:10 and 1:100. In this connection it is advantageous to employ, during welding of the thicker materials, a larger pulse duty factor and, during welding of thinner materials, a smaller pulse duty factor. As should be obvious, during welding of thicker material a higher average welding power is required than during welding of thinner material.

Due to the long decay time of the impulses the cooling of the molten material is controlled as mentioned above. In order to produce in the welding seam a grain size which is best for the particular material it is appropriate to have the decaying edge of the impulses first run flat and then steep. In this way it is obtained that the cooling in the critical range takes place slowly, i.e. that a structure of the desired grain size may form. But it is also possible to give the decaying edge any other desired form.

The new welding process presents, with respect to the "deep-welding" process operating with a continuous beam, the additional advantage that with the same average beam current a penetration depth may be reached which is about two to three times as high. This is due to the fact that during the average impulse range a high impulse may be chosen, and nevertheless, the average value of the beam current is not high due to the otherwise flat shape of the impulses and the large impulse spaces.

It is also possible, and in many cases advantageous, to combine the new welding process with already known beam controls, for example for moving the beam of charged particles along or across the welding seam, or carrying out a circular movement of the beam of charged particles.

The invention will be explained in greater detail hereafter by means of the FIGURES 1–8.

In these figures:

FIGS. 2 to 7 show various forms of the impulses of the beam of charged particles.

FIG. 8 shows a section through a workpiece consisting of three parts interconnected by welding, wherein one welding operation has been carried out by the known deep-welding process and the other welding operation according to the process of the present invention.

Figure 1:
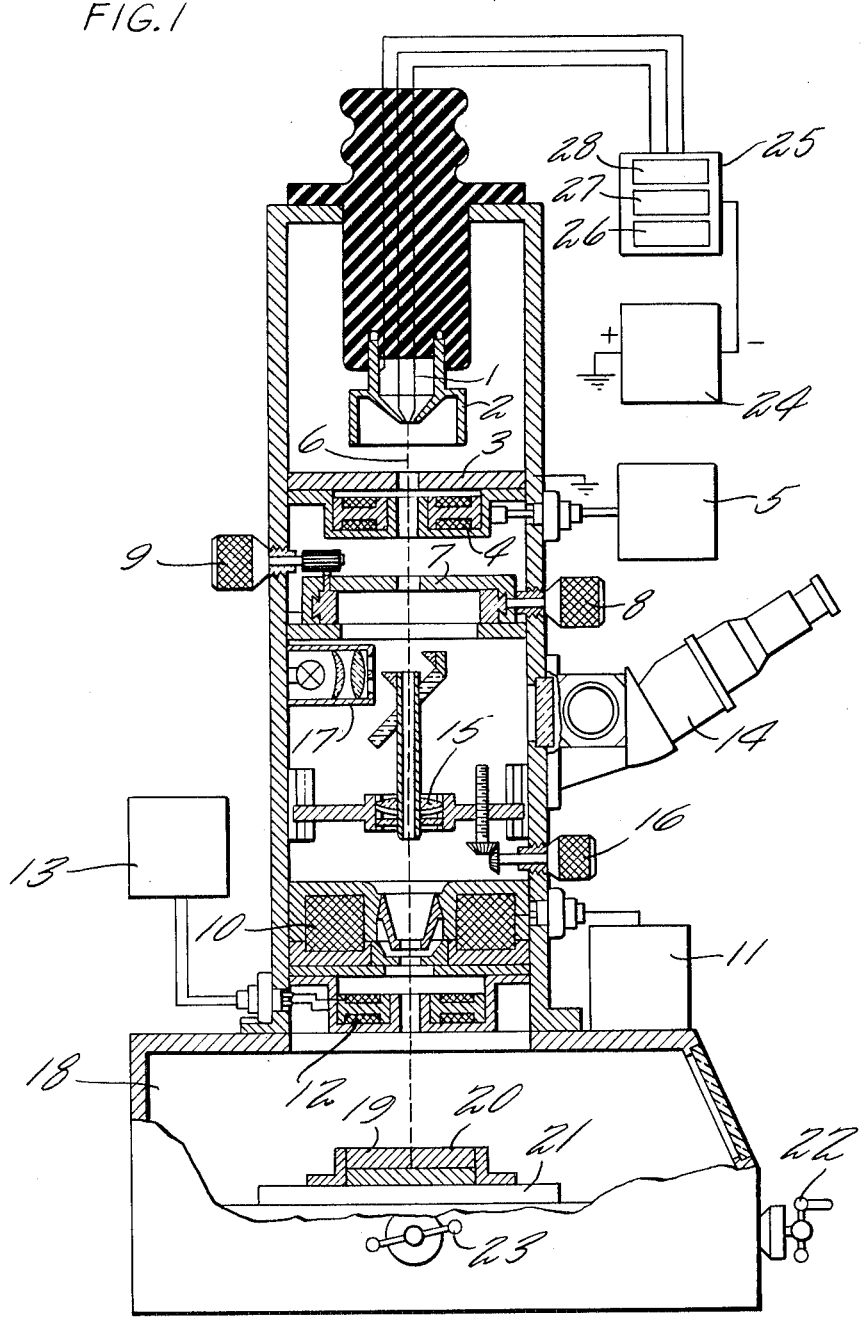
FIG. 1 shows a known apparatus by means of which the new process may be practiced.

The apparatus illustrated in FIGURE 1 shows a cathode 1, a control cylinder 2 and a grounded anode 3 of the beam generating system. A focusing system comprising adjustment coils 4 and a diaphragm 7 is arranged below anode 3. A power supply 5 provides current for adjustment coils 4. The electrons emanating from the electron gun assembly comprised of cathode 1, control electrode 2 and anode 3 are further collimated into a beam by adjustment coils 4 and diaphragm 7. Diaphragm 7 may be positioned at a desired point along the beam axis via adjustment knobs 8 and 9 and their associated gear trains.

An electromagnetic lens 10 whose current supply device is designated by numeral 11 serves to focus the electron beam 6 at the desired point which, in the usual instance, is the surface of the work. In the direction of the beam below this lens 10 an additional deflecting system 12 is arranged which serves to deflect the electron beam 6 relative to the workpiece to be worked. Numeral 13 designates the generator for the current supply to the deflecting system 12.

A system for the optical observation of the workpieces to be worked is arranged between the diaphragm 7 and the electromagnetic focusing lens 10. This system consists of a stereomicroscope 14 whose objective lens is separated from the microscope carrier and arranged at 15. By means of the knob 16 lens 15 may be moved in the vertical direction so that the observation arrangement may be adjusted precisely to the workpiece to be worked. In order that also an observation of the workpiece may be obtained before the actual electron beam working, an arrangement 17 for illuminating the workpiece is provided. The arrangement 17 furnishes a parallel light which is deviated over two prisms and is focused by means of the objective lens 15 onto the surface of the workpiece to be worked.

In the working chamber 18 the workpiece consisting of two parts 19 and 20 is placed on a cross-table 21 which may be moved by means of handwheels 22 and 23 in the plane of the sheet of the drawing and perpendicularly to this plane. In place of the handwheels it is possible to employ electromotors which carry out the movement of the cross-table 21.

Numeral 24 indicates a device for generating a variable high-voltage on the order of 150 kv. This device is connected over a cable with an another device 25. Device 25 comprises a unit 26 for generating the variable heating current for the cathode, the unit 27 for generating the variable bias voltage for the control cylinder and the unit 28 for generating control impulses.

The unit 28 for generating the control impulses contains an impulse generator as well as various timing elements, for example inductances and capacitances. By means of these timing elements the impulse generated by the impulse generator is shaped in a desired and known manner.

By means of the deflecting system 12 illustrated in FIGURE 1 the electron beam 6 may move, depending on the existing welding problem, relative to the workpiece which is moved in the welding direction by a movement of the cross-table 21. Thus it is possible for example, to move the electron beam 6 periodically in the direction of the welding seam, or across the direction of the welding seam. Under certain circumstances it may also be advantageous to move the electron beam 6 in a circular manner on the workpiece.

Several forms of the electron beam impulse are illustrated as examples in FIGURES 2 to 7.

FIGURE 2 shows the shape of an electron beam impulse as a function of time. This impulse shows a linear and relatively steep rising edge 30 and a linear and flat decaying edge 32. Between the edges 30 and 32 the range 31 is located in which the electron beam shows a sufficient power density for the evaporation of the material ("deep welding"). The range 31 has in the example shown only a length which corresponds approximately to 0.09 of the impulse duration. The decaying edge 32 is approximately four times as long as the rising edge 30.

FIGURE 3 shows the shape of another electron beam impulse in which the rising edge 33 and the decaying edge 34 are again linear. The decaying edge 34 is here twice as long as the rising edge 33. The range 35 over which the impulse reaches the full amplitude has a time length which is about 0.03 of the impulse duration. For example, the rising edge 33 may extend over a time of 100 µsec., the range 35 over a time of 10 µsec. and the decaying edge 34 over a time of 200 µsec. The total duration of the impulse thus amounts to 310 µsec. Employing pulses having the shape and duration as above described, a steel plate of 3 mm. thickness may be butt welded to another like plate by employing a pulse duty factor of about 1:10, i.e., the particular duration of an impulse pause amounts to about 3 msec. in the example given.

In the impulse form of FIGURE 4 the rising edge 36 merges directly into the range in which the impulse reaches the full amplitude. The rising edge 36 has a convex shape while the decaying edge 37 is flat and linear.

In the electron beam impulses of FIGURE 5 the rising edge 38 extends linearly while the decaying edge 39 has a convex shape. In this case T indicates the border or threshold level above which the power density of the beam is sufficient for "deep welding". As one may see clearly this value is obtained in the example shown only during a time which is very short in comparison to the impulse duration.

The relationships in the impulse forms shown in FIGURES 6 and 7 are also similar. The electron beam impulse shown in FIGURE 6 shows a rising edge 40 which extends concavely and has a convexly extending decaying edge 41. The impulse shown in FIGURE 7 has a concave and almost exponentially extending rising edge 42, a slightly dropping part 51 over which the power density of the beam necessary for producing the "deep-welding" is reached, as well as a concave and almost exponentially extending decaying edge 43.

The examples of the electron beam impulses illustrated in FIGURES 2 to 7 are not exhaustive. Impulses having other forms may also be used which reach a power density sufficient to produce "deep welding" only during a time which is short in relation to the impulse duration and which have, in relation to the impulse duration, long rising and decaying times.

In many cases it will not be necessary to pay particular attention to the rising edge. In such cases it is possible to employ impulses whose rising edges are, for example, very steep as in the case of square impulses. But it is important in all cases that the impulses have a long decaying edge.

FIGURE 8 shows a workpiece consisting of three parts 44, 45 and 46. The parts 44 and 45 are welded together by means of an electron beam which impinges as a continuous beam. The electron beam was controlled in such a way that a characteristic "deep-weld" 47 was produced. The cross-sectional form of the welding seam is approximately V-shaped and the welding seam shows an upper bead 48 and a lower bead 49. These two beads have been obtained in that the workpieces 44 and 45 have been drawn together to a small extent during the cooling of the liquefied material in the welding seam.

The parts 45 and 46 have been welded together with the new process of this invention. As one may see, a welding seam 50 has been produced which—also in relationship to the fusion zone seam 47—is very small, and furthermore the welding seam 50 is characterized by almost parallel walls. It shows furthermore almost no upper and lower beads. Additionally no depression has been produced at the upper and lower sides of the workpieces. The welding seam closes almost even with the upper and lower surface of the workpieces. As the welding seam 50 is extremely narrow and furthermore extends between parallel walls, practically no tension or drawing effect takes place during the welding. Because of the controlled cooling of the material which is liquefied in the welding zone during the long decaying zone of the impulses, the welding seam 50 is practically free of cavities. Furthermore, the grain structure in the welding seam may be influenced in a desired manner by a corresponding choice of the form of the decaying edge of the impulse.

While preferred embodiments of this invention have been shown and disclosed, various modifications and substitutions may be made without deviating from the spirit and scope thereof. Thus, it is to be understood that this invention is to be limited only by the prior art taken in view of the appended claims.

What is claimed is:

1. A process for joining at least a first pair of work pieces which comprises the steps of:
   generating an intense beam of electrons;
   positioning the pieces to be joined in abutting relationship in line with the beam;
   increasing the beam power density in accordance with a predetermined schedule over a first period of time to a threshold level sufficient to promote evaporation of and to thus permit penetration of the beam into the work;
   maintaining the beam power density above the threshold level for a second period of time less in duration than said first period of time whereby melting and fusion of the work over the entire depth of the penetrating beam will result during said maintenance period; and
   decreasing the beam power density in accordance with a predetermined schedule, the time required to decrease the power density from the threshold to its final level being at least equal to said first period of time, whereby controlled cooling of the fusion zone occurs and a resolidified zone free of cavities results.

2. The method of claim 1 wherein the beam is generated intermittently and the initial and final power density levels are accordingly zero.

3. The method of claim 2 wherein the ratio of the on to off time of the beam is in the range of 1/10 to 1/100.

4. The method of claim 3 wherein the on time of the beam does not exceed $10^{-2}$ seconds.

References Cited by the Examiner

UNITED STATES PATENTS

| | | | |
|---|---|---|---|
| 2,778,926 | 1/1957 | Schneider | 219—117 |
| 2,793,282 | 5/1957 | Steigerwald | 219—69 |
| 2,902,583 | 9/1959 | Steigerwald | 219—50 |
| 2,968,723 | 1/1961 | Steigerwald | 250—49.5 |
| 3,033,974 | 5/1962 | Schleich et al. | 219—117 |

RICHARD M. WOOD, *Primary Examiner.*

JOSEPH V. TRUHE, *Examiner.*